Figure 1:
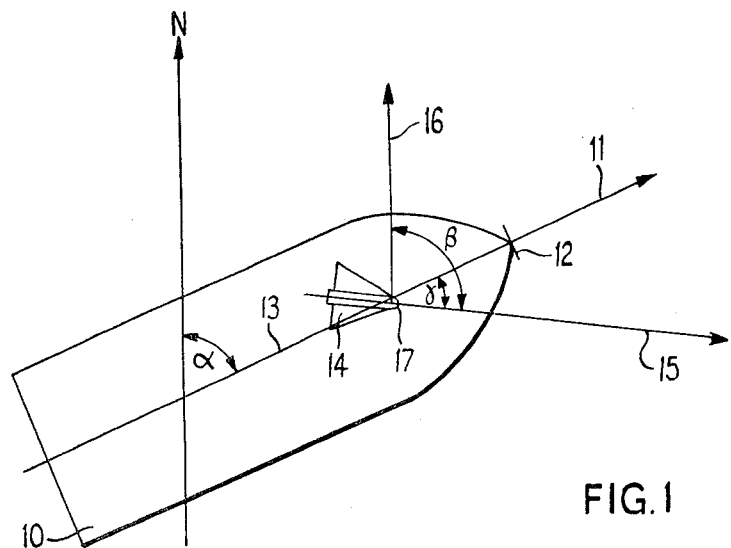

United States Patent [19]
Matthews

[11] 3,903,398
[45] Sept. 2, 1975

[54] INERTIAL NAVIGATION SYSTEMS

[75] Inventor: Michael Arthur Vivian Matthews, Edinburgh, Scotland

[73] Assignee: Ferranti, Limited, Hollinwood, England

[22] Filed: June 6, 1974

[21] Appl. No.: 476,995

[30] Foreign Application Priority Data
June 12, 1973 United Kingdom............... 27989/73

[52] U.S. Cl............................ 235/150.25; 114/43.5
[51] Int. Cl.²......................................... G06G 7/78
[58] Field of Search..... 235/150.25, 150.26, 150.27; 244/3.2, 77 R, 77 S; 318/580, 588; 73/178 R, 178 T, 178 H, 180; 114/43.5; 33/286, 1 R

[56] References Cited
UNITED STATES PATENTS

| | | | |
|---|---|---|---|
| 3,003,451 | 10/1961 | Lundin et al. | 114/43.5 |
| 3,328,881 | 7/1967 | Iddings | 73/178 R X |
| 3,395,270 | 7/1968 | Speller | 235/150.25 |
| 3,829,659 | 8/1974 | Margolis | 235/150.25 X |
| 3,843,263 | 10/1974 | Snead | 114/43.5 X |

*Primary Examiner*—Joseph F. Ruggiero
*Attorney, Agent, or Firm*—Cameron, Kerkam, Sutton, Stowell & Stowell

[57] ABSTRACT

Apparatus for checking and correcting the heading alignment of an inertial platform carried by a vehicle by comparison with a base station having equipment for determining the orientation of a datum line at the base station relative to a fixed reference direction, comprises a sighting mark on the vehicle, and a mirror fixed to the base station in which an image of the sighting mark may be visible to an observer in the vehicle only when the vehicle is located on a base line substantially normal to the mirror. A movable aiming mark in the vehicle may be aligned with the image and a pick-off develops an electrical signal indicating the position of the aiming mark relative to the fore-and-aft axis of the vehicle. This signal, and further signals indicating the heading of the datum line and the base line relative to the reference direction are applied to a navigation computer in the vehicle.

9 Claims, 3 Drawing Figures

PATENTED SEP 2 1975　　　　　　　　　　　　　　　　　　　3,903,398

INERTIAL NAVIGATION SYSTEMS

This invention relates to inertial navigation systems of the type in which a vehicle carries an inertial platform and a navigation computer.

In a vehicle of this type it is necessary to ensure that the platform is correctly aligned before the vehicle starts out on a journey. This requires that information relating to the vehicle's heading, position and, possibly, speed are accurately known. In the case of a land-based vehicle this is relatively easy to achieve since the position of its starting point or "base" should be accurately known and its speed may conveniently be made zero. The precise determination of heading may be more difficult to achieve.

In the case of ship-based aircraft the situation is very different. The "base," that is the ship, will almost certainly be moving with a complex motion involving forward speed, pitching and rolling.

Arrangements are known, particularly for ship-based aircraft, by which the necessary alignment of the aircraft platform may be effected, but these are complex and, in most cases, lengthy. Such arrangements usually include means for determining the position of the vehicle in space relative to a reference inertial platform fixed with respect to the base. As already stated, the precise determination of the heading of the vehicle is more difficult. Arrangements of this type are described in commonly owned U.S. Pat. No. 3,790,766.

It is an object of the invention to provide simple apparatus for checking and correcting the heading alignment of an inertial platform carried by a vehicle.

According to the present invention there is provided apparatus for checking and correcting the heading alignment of an inertial platform carried by a vehicle by comparison with a base station having equipment for determining the orientation of a datum line at the base station relative to a fixed reference direction, which includes a sighting mark carried on the vehicle, a mirror fixed relative to the base station in which an image of the sighting mark may be visible to an observer located in the vehicle only when the vehicle is located on a base line extending substantially normal to the mirror and at a fixed known angle relative to the datum line, an aiming mark carried on the vehicle and movable so as to be capable of alignment with the image of the sighting mark formed in the mirror, pick-off means for developing an electrical signal indicative of the position of the aiming mark relative to the fore-and-aft axis of the vehicle, and a navigation computer carried by the vehicle and responsive to the said electrical signals and to further signals indicating the heading of the datum line and the base line relative to the reference direction of check and correct the heading alignment of the vehicle inertial platform.

An embodiment of the invention will now be described with reference to the accompanying drawings, which relate to the alignment of an inertial platform carried in a ship-based aircraft.

Figure 2:
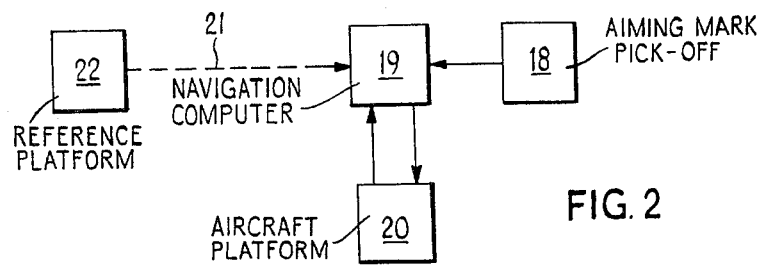
Figure 3:
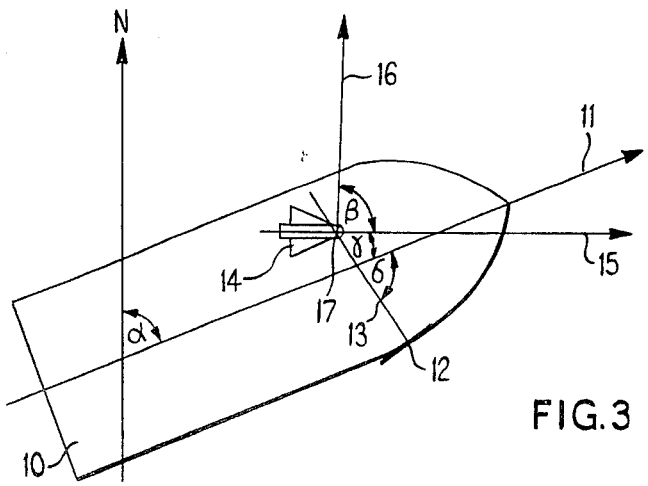

In the drawing:

FIG. 1 is a schematic diagram showing the ship and aircraft alignment axes in which the mirror defines a line along the ship's fore-and-aft axis, FIG. 2 is a block diagram of the electronic parts of the apparatus, and FIG. 3 is a diagram similar to FIG. 1 in which the mirror defines a line at an angle to the ship's fore-and-aft axis.

Referring now to FIG. 1, a ship's outline is represented schematically at 10, the fore-and-aft, or heading, axis of the ship being indicated at 11 and forming the datum line. The ship carries means for determining the orientation of the datum line, such as a reference inertial platform (not shown) which is oriented in azimuth in a reference direction, such as North, which is at an angle $\alpha$ to the ship's axis 11.

A mirror 12 is located at or near the bow of the ship. This mirror is a corner reflector in the vertical plane, that is, it comprises two mirrors joined at right-angles to one another about a horizontal line. This mirror defines a base line 13 on which an aircraft must be located to align its platform. This base line, which coincides with the datum line 11, extends substantially at right-angles to the surface of the mirror 12. An aircraft, shown schematically at 14, is located on the base line, the aircraft fore-and-aft axis 15 not necessarily being aligned with the datum line 11. The aircraft axis 15 is at an angle $\beta$ to the aircraft platform heading direction 16, ideally north, and at an angle $\Gamma$ to the ship's heading axis 11.

A sighting mark, 17 such as a lamp, is carried at the front of aircraft 14 in such a position that the pilot located in the aircraft is able to see the image of the sighting mark formed in the mirror 12. The pilot compensates for the angle $\Gamma$ between the aircraft's fore-and-aft axis 15 and the line 13 defined by the mirror by adjusting an aiming mark into alignment with the image of the sighting mark. In an aircraft fitted with a head-up display an element of this display may conveniently form the aiming mark. The maximum permissible value of the angle $\Gamma$ is thus limited by the possible extent of the adjustment of the aiming mark. A suitable pick-off measures the position of the aiming mark, giving the value of the angle $\Gamma$.

Referring now to FIG. 2, signals giving the position of the aiming mark 18 are applied to the navigation computer 19, as are other signals indicating the alignment of the aircraft platform 20. Over a suitable communications channel 21 are passed further signals from the ship's reference platform 22. The communication channel may be a detachable cable or a radio link, for example.

In operation the value of the angle $\alpha$ is applied to the navigation computer 19 from the reference platformm and the angle $\Gamma$ is applied from the aiming mark pick-off 18. The angle $\beta$ is also provided by the aircraft platform 20. The check of the heading alignment of the aircraft inertial platform is simply a question of comparing the angle $\alpha$ with the difference $(\beta - \Gamma)$, since for the aircraft platform to be correctly aligned in azimuth $\alpha = (\beta - \Gamma)$.

Any departure from this equality may be corrected by signals from the navigation computer 19 to the aircraft platform 20.

The apparatus described above is particularly useful if the aircraft has to be aligned fairly closely with a defined direction relative to the ship's heading. This is the case with aircraft requiring a take-off run.

In the case of vertical take-off aircraft such as helicopters, it may be more convenient to place the mirror 12 in some other position, so that the base line 13 does not coincide with the ship's fore-and-aft axis. FIG. 3 shows such an arrangement, the same reference being used as in FIG. 1. The only difference is that the mirror 12 is located off the ship's fore-and-aft axis 11 so that the base line 13 defined by the mirror makes a known fixed angle δ with the datum line.

This fixed angle δ is fed into the aircraft navigation computer 19 along with the information already referred to. The aircraft heading axis 16 is correctly aligned with the North datum of the ship's reference platform when $\alpha = \beta + \Gamma - \delta$.

The mirror may, of course, be located in any convenient position on the ship.

If it is necessary to check other parameters of the aircraft inertial platform, then the position of the aircraft relative to the ship's reference platform must be known. This is easily achieved by marking a point on the line 13 on which the aircraft must be positioned before checking may be performed.

All the remarks made above concerning ship-based aircraft also apply to aircraft or other vehicles based on land. In such a case there is no complex motion for which allowance must be made, and the checking of parameters other than azimuth alignment is considerably simplified.

The datum line and base line will be fixed and hence the angles α and δ will be fixed and easily measured.

The mirror 12 need not necessarily be a corner reflector, but may be replaced by any other type of reflector giving an accurately-defined line.

What I claim is:

1. Apparatus for checking and correcting the heading alignment of an inertial platform carried by a vehicle by comparison with a base station having equipment for determining the orientation of a datum line at the base station relative to a fixed reference direction, which includes a sighting mark carried on the vehicle, a mirror fixed relative to the base station in which an image of the sighting mark may be visible to an observer located in the vehicle only when the vehicle is located on a base line extending substantially normal to the mirror and at a fixed known angle relative to the datum line, an aiming mark carried on the vehicle and movable so as to be capable of alignment with the image of the sighting mark formed in the mirror, pick-off means for developing an electrical signal indicative of the position of the aiming mark relative to the fore-and-aft axis of the vehicle, and a navigation computer carried by the vehicle and responsive to the said electrical signals and to further signals indicating the heading of the datum line and the base line relative to the reference direction to check and correct the heading alignment of the vehicle inertial platform.

2. Apparatus as claimed in claim 1 in which the mirror is in the form of a corner reflector in the vertical plane.

3. Apparatus as claimed in claim 1 in which the base line coincides with the datum line.

4. Apparatus as claimed in claim 1 in which the sighting mark includes a light source.

5. Apparatus as claimed in claim 1 in which the aiming mark forms part of a head-up display carried by the vehicle.

6. Apparatus as claimed in claim 1 in which the base station is equipped with an inertial platform operable to develop said further signals for application to the navigation computer.

7. Apparatus as claimed in claim 1 which includes a communication channel between the vehicle and the base station over which said further signals may be passed.

8. Apparatus as claimed in claim 7 in which said communication channel is a detachable cable.

9. Apparatus as claimed in claim 1 in which the base station is a ship and the vehicle is an aircraft.

* * * * *